Fig. 1.

April 29, 1930. J. E. GUNTER 1,756,427
FORMING AND ASSEMBLING MACHINE AND PROCESS
Filed Sept. 12, 1927 7 Sheets-Sheet 2

Inventor
James E. Gunter
By Thomas W. J. Clark
Attorney

April 29, 1930. J. E. GUNTER 1,756,427
FORMING AND ASSEMBLING MACHINE AND PROCESS
Filed Sept. 12, 1927 7 Sheets-Sheet 3

Fig. 5.

April 29, 1930. J. E. GUNTER 1,756,427
FORMING AND ASSEMBLING MACHINE AND PROCESS
Filed Sept. 12, 1927 7 Sheets-Sheet 6

Inventor

James E. Gunter,

By Thomas W. Clark
Attorney

April 29, 1930.  J. E. GUNTER  1,756,427
FORMING AND ASSEMBLING MACHINE AND PROCESS
Filed Sept. 12, 1927  7 Sheets-Sheet 7

Inventor
James E. Gunter
By Thomas W. J. Clark
Attorney

Patented Apr. 29, 1930

1,756,427

UNITED STATES PATENT OFFICE

JAMES E. GUNTER, OF BALTIMORE, MARYLAND

FORMING AND ASSEMBLING MACHINE AND PROCESS

Application filed September 12, 1927. Serial No. 219,015.

My invention relates to machines for forming a string like material, such as wire, into a particularly constructed ring and assembling the same on an adjoining member, and in the embodiment here shown, it is especially designed to assemble retaining rings on container members, such as tin cans. But in its broader aspects my invention, in whole or in part, may be used in other operations; its utility is not limited, and it is desired to protect such parts as may be used in such other operations.

The principal object of my invention is to produce a ring accurately and quickly and to place it on a container member.

An important object of my invention is to make the ring and completely form it on a mandrel which embodies several of the parts of the machine and then to sever it from the material of which it is formed and transfer it from the mandrel to the container member.

Another object is to so form the ring that when it is on the container member it will hug the container member tightly, it will have considerable centripetal tension, so that when the container member is led away with the ring upon it, it will not jar off. Another object of my invention is to bend part of the ring material from the path of the ring, to form a handle to remove the ring after it is seamed in. Another object of my invention is to compress or thin part of this bent away part of the ring material, so that this handle will not interfere with the seaming operation.

Another object of my invention is to make the parts readily adjustable, replaceable and interchangeable so that different sizes of material may be used and different sized rings may be made and different sized containers may be accommodated, and so that repairs may be quickly made.

Numerous other objects and advantages of the invention will be apparent as the invention is explained in connection with the accompanying drawings forming a part of this specification and which show one embodiment of the invention.

The machine here shown as an embodiment of my invention has a wire feed, a ring former, an offset device, a notching device, and a ring cut off device. It also has container member feeding mechanism to place the member in ring receiving position and means to transfer the ring to the member.

Figure 10:
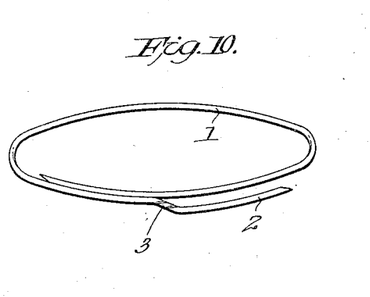
Figure 10 is a view of a completed ring.
Figure 11:
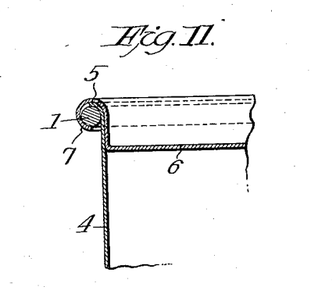
Figure 11 is a vertical section of a container with the ring in place.

The formed ring, shown in Fig. 10 and in a seam on a container in Fig. 11, is patented in my Patent 1,622,236 of March 22, 1927, and as there shown, and as shown in Figs. 10 and 11 has a body portion 1, an offset handle 2, which, at the place of offsetting, is notched or thinned, 3. This ring is placed around a container body member 4, having, preferably, an outer flanged edge 5, and a friction cover member 6, is inserted into the body member. The outer edge 7, of this cover member is curled under the wire and tightly against it. The thinned portion of the ring permits this curling operation to take place where the handle projects. When it is desired to open the container, the handle is pulled down, the cover edge is thereby uncurled, and the cover may be lifted out.

The machine as here shown is mounted on a base 8. The wire feeding mechanism, by itself forming no part of the present invention, may be driven by a belt over pulley 9 mounted loose on shaft 10. The pulley rotates the shaft when connected thereto by clutch mechanism 11. This clutch mechanism may be operated from the front of the machine by a handle 12. Shaft 10 has on it a hand wheel, 13, and a pinion which meshes with gear wheel 14 on shaft 15, from which the various mechanisms of the machine are operated. Gear wheel 14 has in it a slot 16 containing a long screw and a block, which block may be moved in the slot along a radius of the gear wheel by the screw to vary the length of stroke of arm 17, pivoted at one end to the block and at the other to a segment gear 18 which drives a pinion loosely mounted on shaft 19. This pinion, by means of a pawl and ratchet mechanism in casing 20, operates shaft 19 on the left hand stroke of the gear segment, but not on the right hand stroke. Meshing with another pinion on shaft 19 is a pinion 21 on shaft 22. Shaft 22 is carried in a box 23 which may be raised or lowered at the front end by hand screw 24. On the front end of shafts 19 and 22 are grooved wire feeding rolls 25 and 26. The wire 27 passes through adjustable guides 28 and 29 on each side of the feed rolls.

On the head of the base 8 is the back part of a mandrel 30 to which a front part, 31, is attached by screws 32. Between these two parts of the mandrel a lower curling roll 33 is mounted. Upper curling rolls 34 are adjustably mounted on the head of the machine. By varying the vertical position of the upper rolls the ring may be given more or less centripetal tension or "hug" around the mandrel.

At a predetermined place in the course of the formation of the ring around the mandrel, the wire feeding device stops feeding the wire and the offsetting of a portion of the wire from the path of the ring is effected. Mounted, detachably, in the front part of the mandrel 31 is an anvil 35 having two faces, one, 36, in the line or path of the wire curling rolls and against the edge of which the wire is bent, and the other, 37, set forward, to again straighten the wire, so that the bent off part comes back substantially parallel to the body of the ring, that is, a part is offset. The active offsetting tool 37A has parts complementing those of the anvil, a short holding part, 38 and a longer bending part 39. The bending part and the edge against which the wire is bent are slightly removed so that the wire is bent on an oblique angle, so that the strain on the wire is lessened. This offsetting tool has, at its rear end, a slot cut in one side, forming thereby a hook, which fits under a raised prong 40, on plunger 41, which may be rotated to lock into the slot or hook. Spring 41A holds the plunger in its rotated position so that the parts are held locked together. Plunger 41 is on a shaft 42 in the head of the machine, which is reciprocated by bell crank lever 43 fixed on shaft 75 mounted in an upper bracket 44 and passing through a lower opening on the head of the machine. This bell crank receives its motion through a follower riding in the groove of a cam 45 on shaft 15.

While the offsetting tool is holding the wire firmly a notching tool 46 comes between the two parts of the offsetting tool to thin part of the wire where the offset occurs. An anvil 47, adjustable by screw 48, to vary the depth of the notch, is in back of the notching tool on the front part of the mandrel, and against it the wire is pressed. In the same holder 49 that adjustably holds the notching tool is a bar 50 which comes against a lower part of the ring so that the pressure of the notching tool will not straighten out the ring. Holder 49 is on slide 51 working in wide grooves on the face of the head of the machine. Slide 51 has a follower 52 working in a cam groove on cam wheel 53 which is fast on shaft 15.

Figure 7:
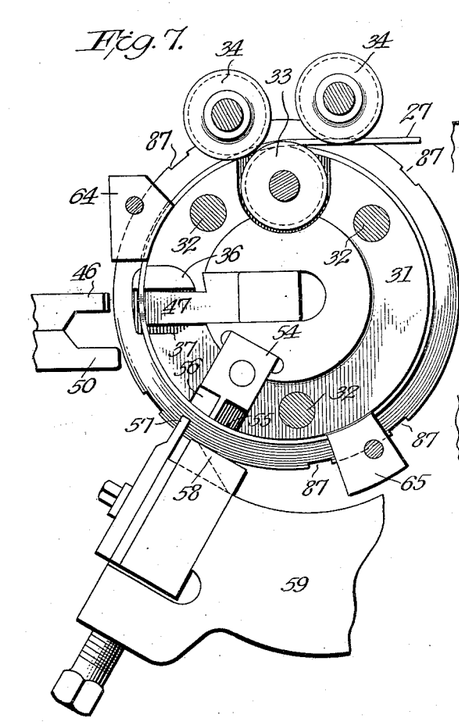
Figure 7 is a rear view of the front part of the mandrel and certain other details.
Figure 9:
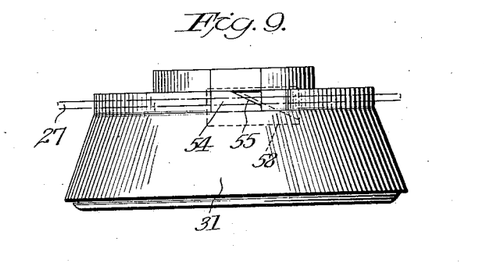
Figure 9 is a detail showing the cutting die and knife.

After the ring material is offset and notched, the feeding mechanism again starts and a complete ring is formed, and then the ring is severed from the material while the feeding mechanism is again at rest. The ring as cut off leaves sufficient material curled to form the handle of the succeeding ring before the feeding mechanism starts again. A cutting die 54 with an oblique cutting edge 55, and a space 56 for a separating finger 57 is detachably mounted in the front part of the mandrel 31. Against this cutting edge the wire is pressed by a knife 58 to cut off the finished ring. The knife cuts diagonally as shown in Figs. 7 and 9. This knife and its accompanying separating finger are adjustably mounted in bell crank lever 59, which is given its reciprocating motion through lever 60 and bell crank lever 61 by the follower 62 riding in a cam groove on the rear of cam wheel 63 on shaft 15.

The ring being formed passes through a groove in guide 64 which both separates the strands of wire and holds the strand being curled down upon the mandrel, while guides 65 and 66 guide the curled wire out of the path of the curling rolls.

Figure 1:
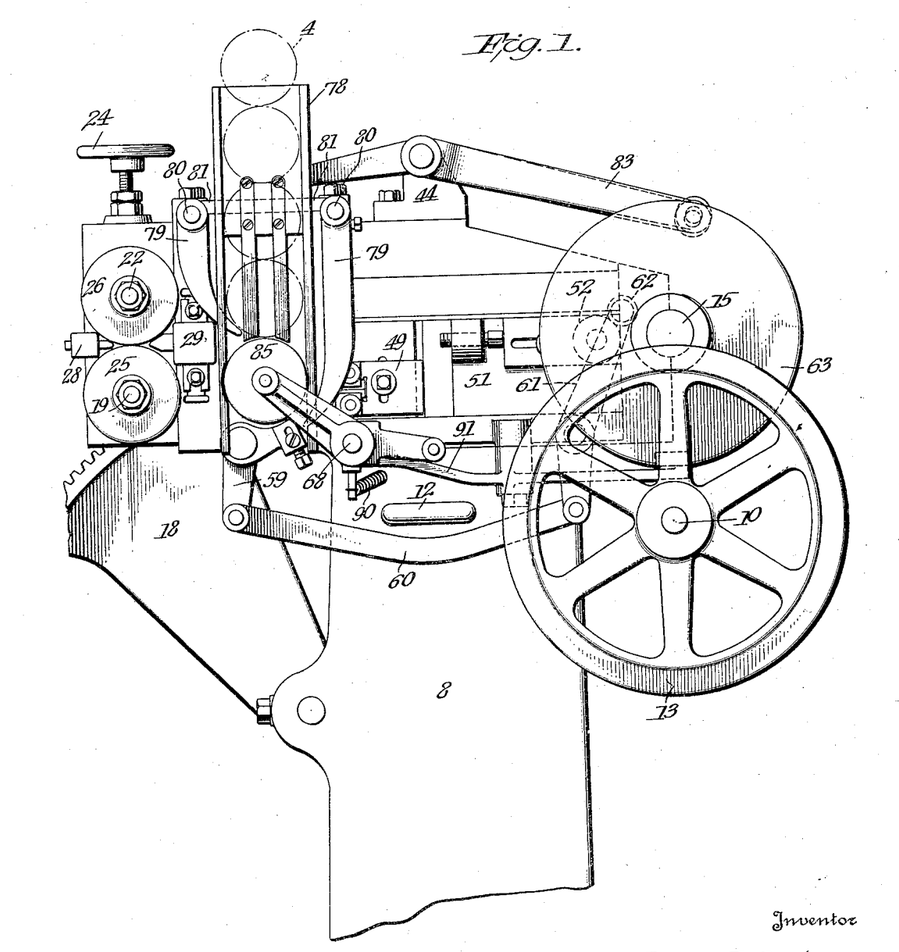
Figure 1 is a front elevation of an apparatus embodying the present invention, with parts broken away.
Figure 2:
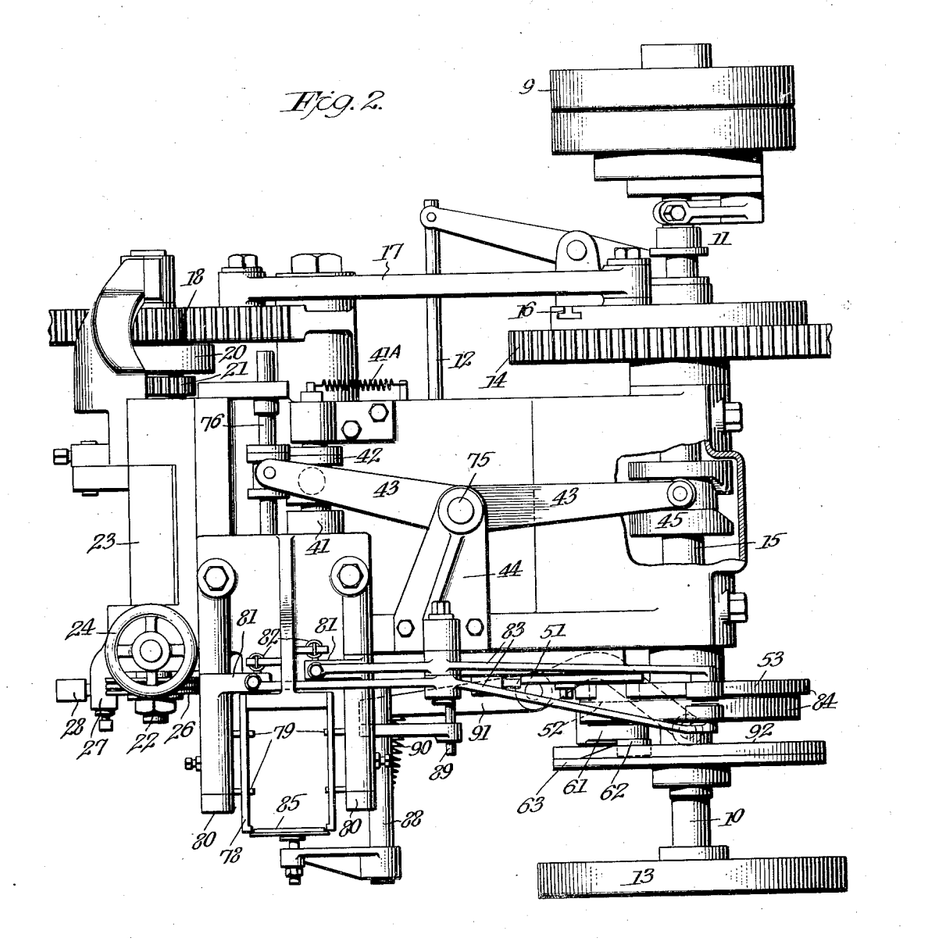
Figure 2 is a top plan view thereof.
Figure 3:
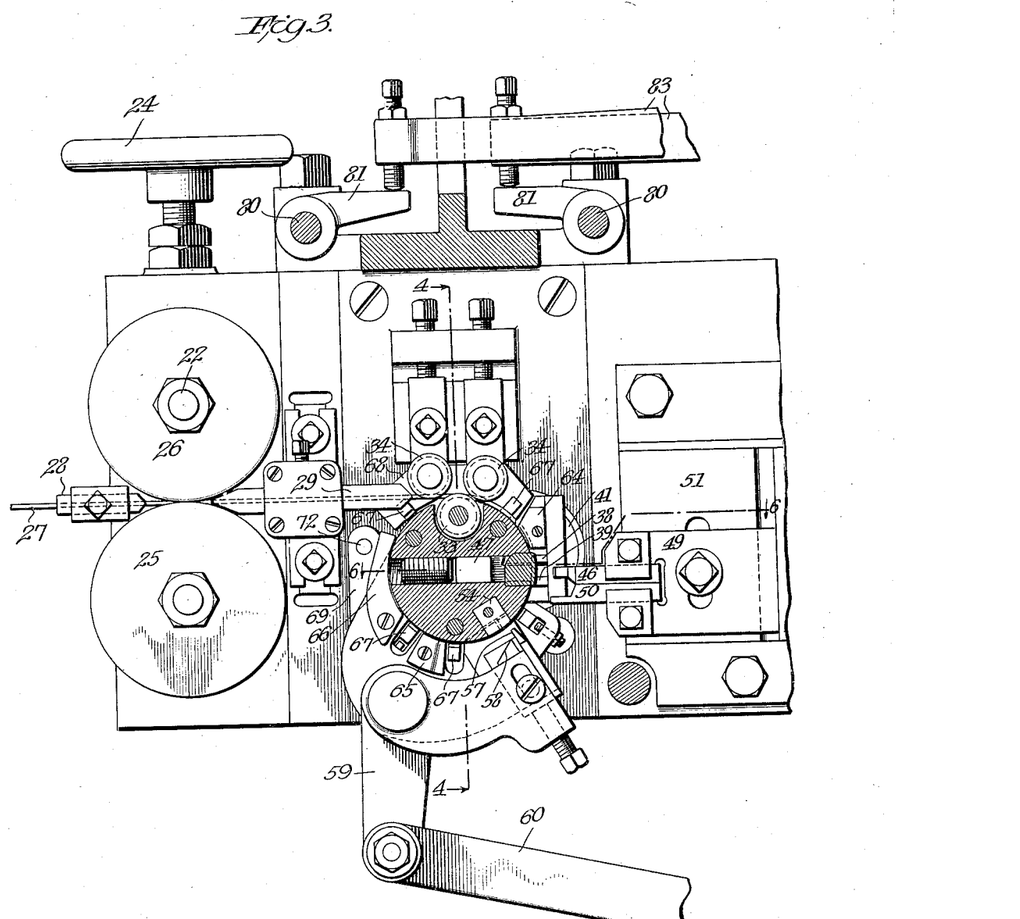
Figure 3 is an enlarged view, similar to Fig. 1, with certain parts shown in section.
Figure 4:
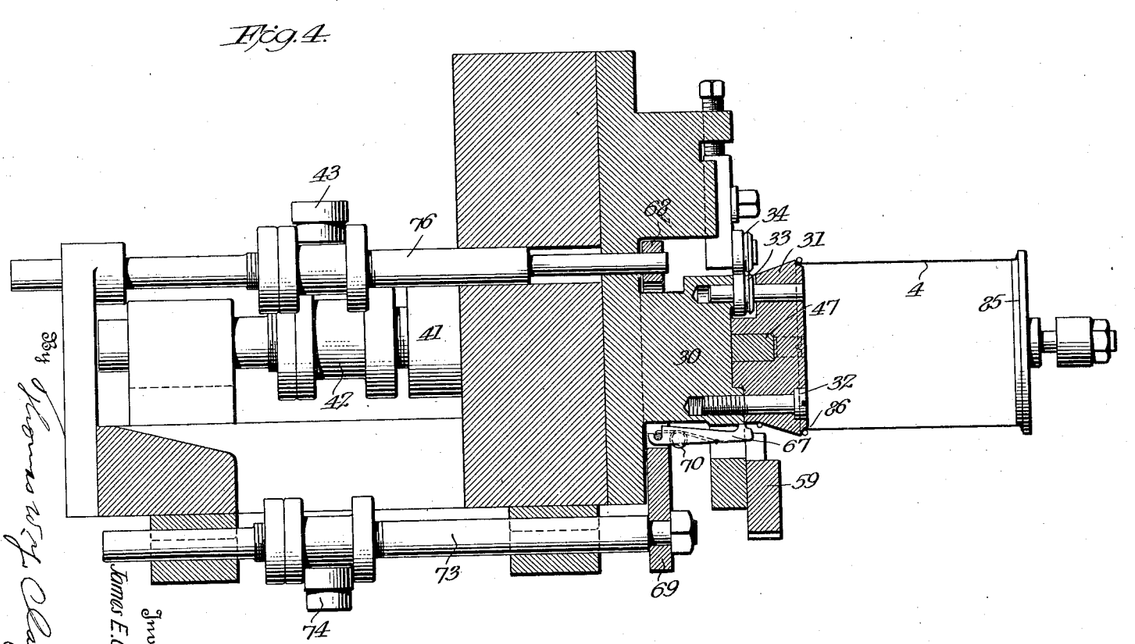
Figure 4 is a vertical sectional view substantially on line 4—4 of Fig. 3.
Figure 5:
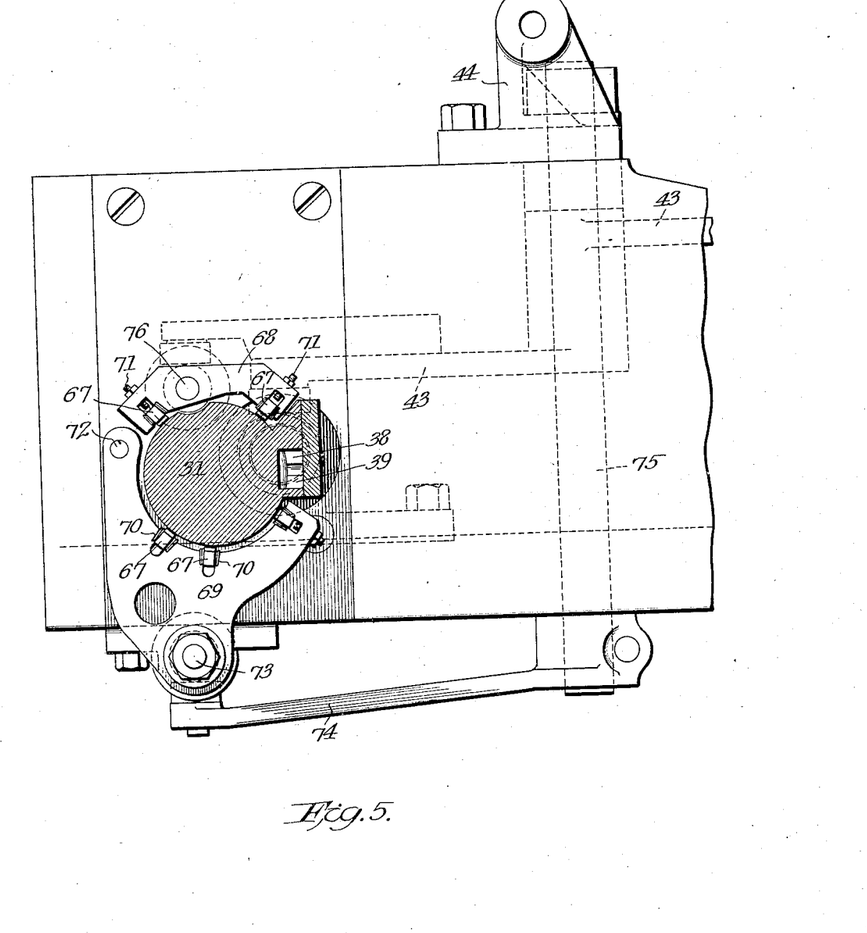
Figure 5 is a detailed sectional view, showing the transfer means and other details.
Figure 6:
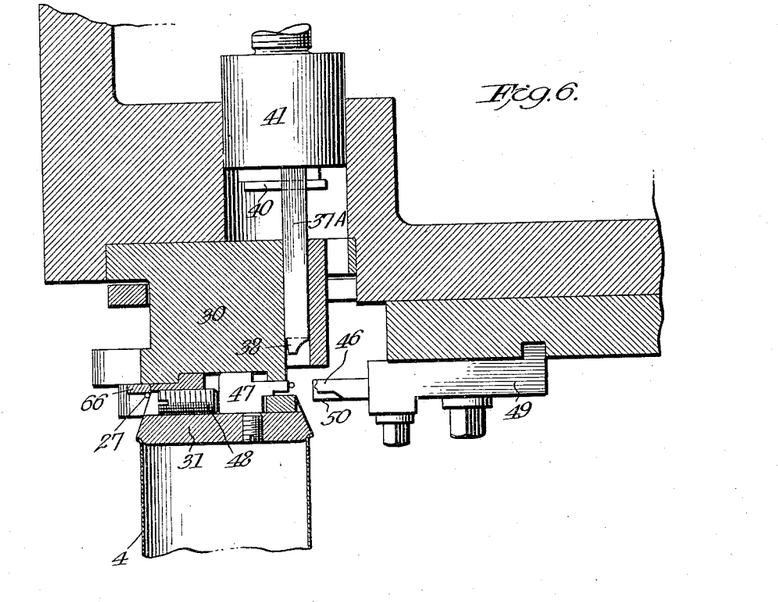
Figure 6 is a partial sectional view showing principally the offset and notching tools, on line 6—6 of Fig. 3.
Figure 8:
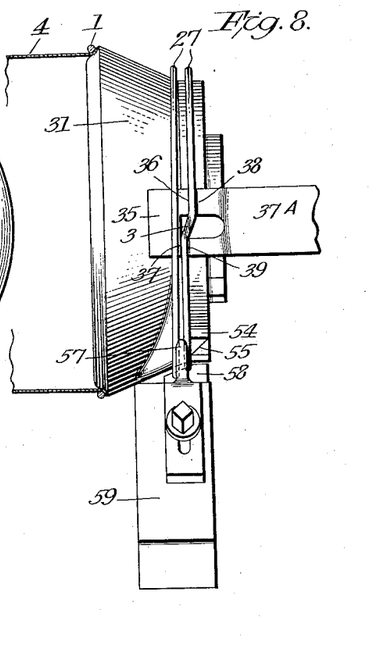
Figure 8 is a side view thereof.

In Figure 3 the wire is shown with a part curled, while in Figs. 7 and 8 a complete ring is shown being cut off with the next one offset and notched.

After the ring is formed, and just before it is cut off, strip off fingers or transfer means recede to their farthest back position, and when the ring is cut off, the fingers push it forward over the tapered end of the mandrel, and then recede part way back to be out of the way of the forming mechanisms. These fingers 67 are detachably pivoted at their rear ends around pins held in plates 68 and 69. U shaped springs 70, with the bottom of the U over the back of the fingers in grooves and the prongs in holes in the plates, tend to force the fingers inwardly. These fingers have front ends adapted to ride over a ring in receding and to push it forward when coming forward. Screws 71 in the plates keep certain of the fingers from coming out easily. Plate 69 rides on a pin 72, as well as being held by its actuating rod 73 slidingly mounted in the head of the machine and on its rear end having a grooved collar in which works a roller on one end of a lever 74, fixed on the lower end of shaft 75. Plate 68 partially guided by edges of the head in which it works, is fixed to rod 76 which is reciprocated by a roller on the extreme end of bell crank lever 43. Plates 68 and 69 are thus reciprocated as one.

A container member chute 78 carries members to ring receiving position before the mandrel and then permits them to pass on. Alternately reciprocating fingers 79 first permit one member to fall in place, and hold it there, then let that member pass on and hold back the others, then another is dropped in place. These fingers are pivoted on rods 80 and each set has an arm 81. These arms are pulled up by tension springs 82. To spread the fingers, bell crank levers 83 press down on the arms 81. These bell crank levers have rolls riding on properly formed cams 84 on the outside rim of cam wheel 53.

As each container member is dropped into place, a reciprocating plunger 85 forces the member up on the slightly tapered nose 86 of the large end of the mandrel. This large end of the mandrel is notched, 87, to guide the transfer fingers. The ring is pushed out over the large end of the mandrel, and enlarged by the large end of the mandrel, and then allowed to snap into place on the container member when it slips off of the mandrel onto the container member. It thus has sufficient centripetal tension not to easily jar from the container member. This plunger 85 is mounted on a rod 88. The plunger has a tension spring 90 tending to pull it in against a container member. A bell crank lever 91, has one end bearing on a plate fast to rod 88, and when it operates, the rod, and plunger 85, are pushed outwardly. A hole in this plate also slides on rod 89 to additionally support the plunger. The other end of this bell crank lever has a roller riding on a face cam 92 on the rear of the same wheel that groove cam 63 is on.

The various cams are so grooved and faced and timed in their action that the operations above described take place in the desired sequence.

The mandrel, and the chute and parts operating in and on the two can be taken off, and others put on for larger or smaller sized containers and larger or smaller sized wire and rings, and some variation can be provided by adjustments of the parts without interchanging them. For wide variations of sizes, however, several machines would be preferable.

The machine as shown is designed to be placed in a line of can making machinery, to receive body members from a body maker and to pass on ringed bodies to a seamer.

The foregoing detailed description has been given for clearness of understanding only, and no unnecessary limitations should be understood therefrom, but the appended claims should be construed as broadly as permissible.

What I regard as new and desire to secure by Letters Patent, is:

1. In ring forming and placing mechanism, a mandrel, material feeding mechanism, means to form a ring of said material around said mandrel, mechanism to sever a formed ring from the material and means to transfer said ring from said mandrel to an adjoining member.

2. In a ring forming and placing mechanism, a mandrel, material feeding mechanism, means to form a ring of said material around said mandrel, mechanism to sever a formed ring from the material and means to expand and to transfer said ring from said mandrel to an adjoining member.

3. Mechanism for forming and placing a resiliently holding ring on a member comprising a mandrel, means to form a ring around said mandrel, mechanism to bring a member to ring receiving position and means to expand and to transfer said ring from said mandrel to said member.

4. In ring forming and placing mechanism, a mandrel, material feeding mechanism, means to form a ring of said material around said mandrel, mechanism to sever a formed ring from the material, mechanism to yieldingly place a member against said mandrel and means to transfer said ring from said mandrel to said member.

5. In ring forming and placing mechanism, a mandrel, material feeding mechanism, means to form a ring of said material around said mandrel, mechanism to sever a formed ring from the material, mechanism to place a member in axial alignment with said mandrel and means to transfer said ring from said mandrel to said member.

6. Mechanism for forming and placing a resiliently holding ring on a member comprising a mandrel, means to form a ring around said mandrel with sufficient centripetal tension to securely surround a member and means to transfer a formed ring from said mandrel to a member.

7. Mechanism for forming and placing a resiliently holding ring on a member comprising a mandrel, means to form a ring around said mandrel with sufficient centripetal tension to securely surround a member, means to vary the amount of centripetal tension in said ring, and means to transfer said ring from said mandrel to a member.

8. In ring forming and placing mechanism, a mandrel, material feeding mechanism, means to form a ring of said material around said mandrel, mechanism to sever a formed ring from the material, means to vary the length of material in said ring, and means to transfer said ring from said mandrel to an adjoining member.

9. The process of forming and placing a ring on a member, which consists in forming a ring around a mandrel with sufficient centripetal tension to securely surround a member and transferring said ring from said mandrel to a member.

10. In ring forming and placing mechanism, a mandrel, material feeding mechanism, means to form a ring of said material around said mandrel, mechanism to sever said ring, after its formation, from the material, mechanism adjustable to different lengths of members to place a member against said mandrel and means to transfer said ring from said mandrel to said member.

11. Mechanism for forming and placing a resiliently holding ring on a member comprising a mandrel, means to form a ring around said mandrel, bodily removable and interchangeable means to expand and to transfer said ring from said mandrel to an adjoining member.

12. In ring forming and placing mechanism, a mandrel, material feeding mechanism, means to successively form rings of said material around said mandrel, mechanism to successively sever formed rings from the material, mechanism to successively move members to and from said mandrel and means to transfer a ring from said mandrel to each of said members.

13. In ring forming and placing mechanism, a mandrel, material feeding mechanism, means to form a ring of said material around said mandrel, mechanism to sever a formed ring from the material including a cutting die on said mandrel, and means to transfer said ring from said mandrel to an adjoining member.

14. In ring forming and placing mechanism, a mandrel, material feeding mechanism, means to form a ring of said material around said mandrel, mechanism to sever a formed ring from the material, means to adjust said severing mechanism for different sizes of material and means to transfer said ring from said mandrel to an adjoining member.

15. In ring forming mechanism, a mandrel, material feeding mechanism, means to form a ring of said material around said mandrel, mechanism to sever a formed ring from the material including a cutting die on said mandrel and a knife cooperating therewith to sever from said material a ring having therein a predetermined length of material, and a separating finger moving in unison with said knife to separate the portion of the material to be cut from the adjoining portion of said material.

16. In ring forming mechanism, material feeding mechanism, means to form a ring of said material, means to bend a portion of said material from the path of the ring while it is held by the forming means and mechanism to then sever a formed ring with a bent portion from said material.

17. In ring forming mechanism, a mandrel, material feeding mechanism, means to form a ring of said material around said mandrel, means to bend a portion of said material from the path of the ring including a bending edge on said mandrel and a bender cooperating therewith and means to sever a formed ring with a bent portion from said material.

18. In ring forming and placing mechanism, a mandrel, material feeding mechanism, means to form a ring of said material around said mandrel, means to bend a portion of said material from the path of the ring, mechanism to sever a formed ring with a bent portion from the material and means to transfer said ring from said mandrel to an adjoining member.

19. In ring forming mechanism, material feeding mechanism, means to successively form rings of said material, means to offset a portion of each of said rings and means to then successively sever said formed rings with offset portions from said material.

20. In ring forming and placing mechanism, a mandrel, intermittently acting material feeding mechanism, means to form a ring of said material around said mandrel, means to bend a portion of said material from the path of the ring, mechanism to sever said ring from said material, said bending means and severing mechanism acting during inoperative periods of the feeding mechanism and said ring forming and bending means acting prior to said ring severing mechanism, and means to transfer said ring from said mandrel to an adjoining member.

21. Mechanism for forming a ring comprising a mandrel, means to form a ring around said mandrel, means to bend a portion of the material of which the ring is formed from the path of the ring and means to compress a portion of said bent portion.

22. Mechanism for forming a ring comprising a mandrel, means to form a ring around said mandrel, means to bend a portion of the material of which the ring is formed from the path of the ring and means to compress a portion of the bent portion while it is held by the bending means including an anvil on said mandrel and a compressing means cooperating therewith.

23. In ring forming and placing mechanism, a mandrel, means to form a ring around said mandrel, means to bend a portion of the material of which the ring is formed from the path of the ring, means to compress a portion of the bent portion and means to transfer a formed ring with a bent and compressed portion from said mandrel to an adjoining member.

24. Mechanism for forming a ring comprising a mandrel, means to form a ring around said mandrel, means to offset a portion of said ring and means to compress said ring between the parallel parts thereof.

25. Mechanism for forming a ring comprising a mandrel, means to form a ring around said mandrel, means to offset a portion of said ring, including two spaced bending edges and coacting holding means, and means to compress said ring between the parallel parts thereof while the adjoining parallel parts are held by said offsetting means.

JAMES E. GUNTER.